INVENTOR
EDWARD D. RAPISARDA

BY Chapin & Neal

ATTORNEYS

June 15, 1965  E. D. RAPISARDA  3,189,271
VARIABLE SPEED DRIVE
Filed Nov. 4, 1959  7 Sheets-Sheet 5
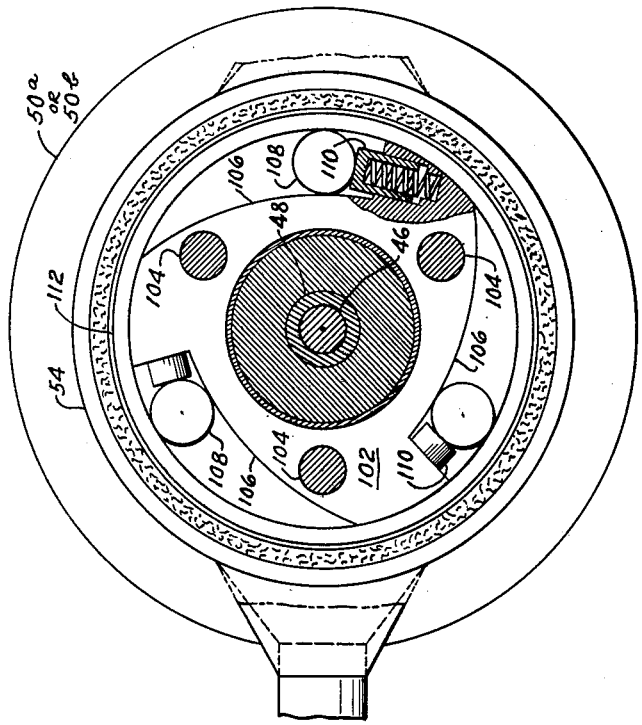
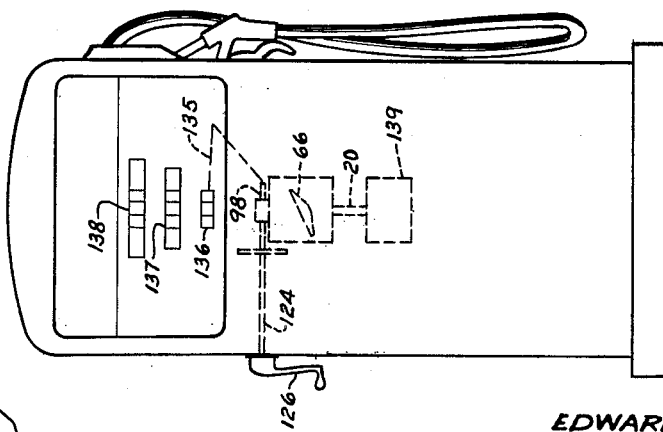
INVENTOR.
EDWARD D. RAPISARDA
BY Chapin & Neal
ATTORNEYS

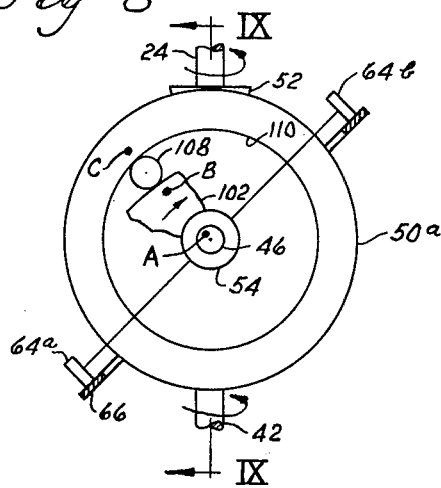
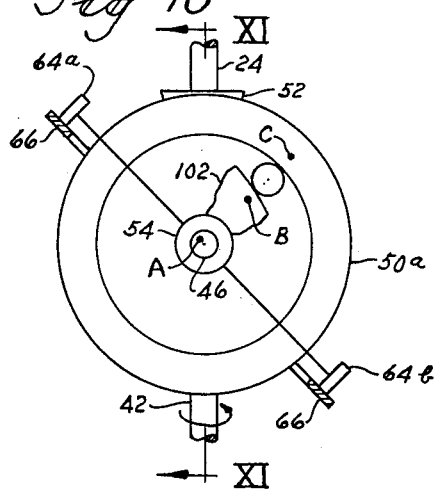
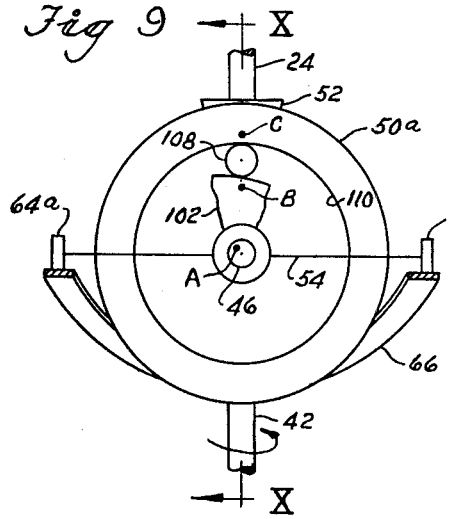
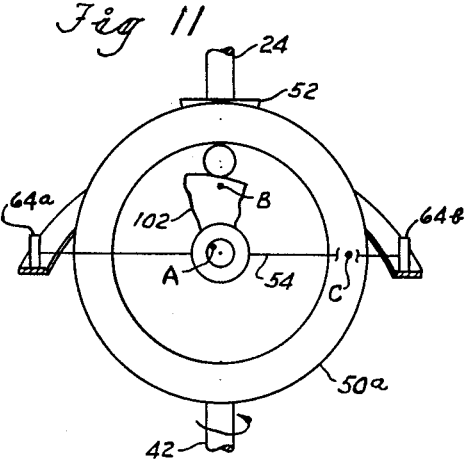

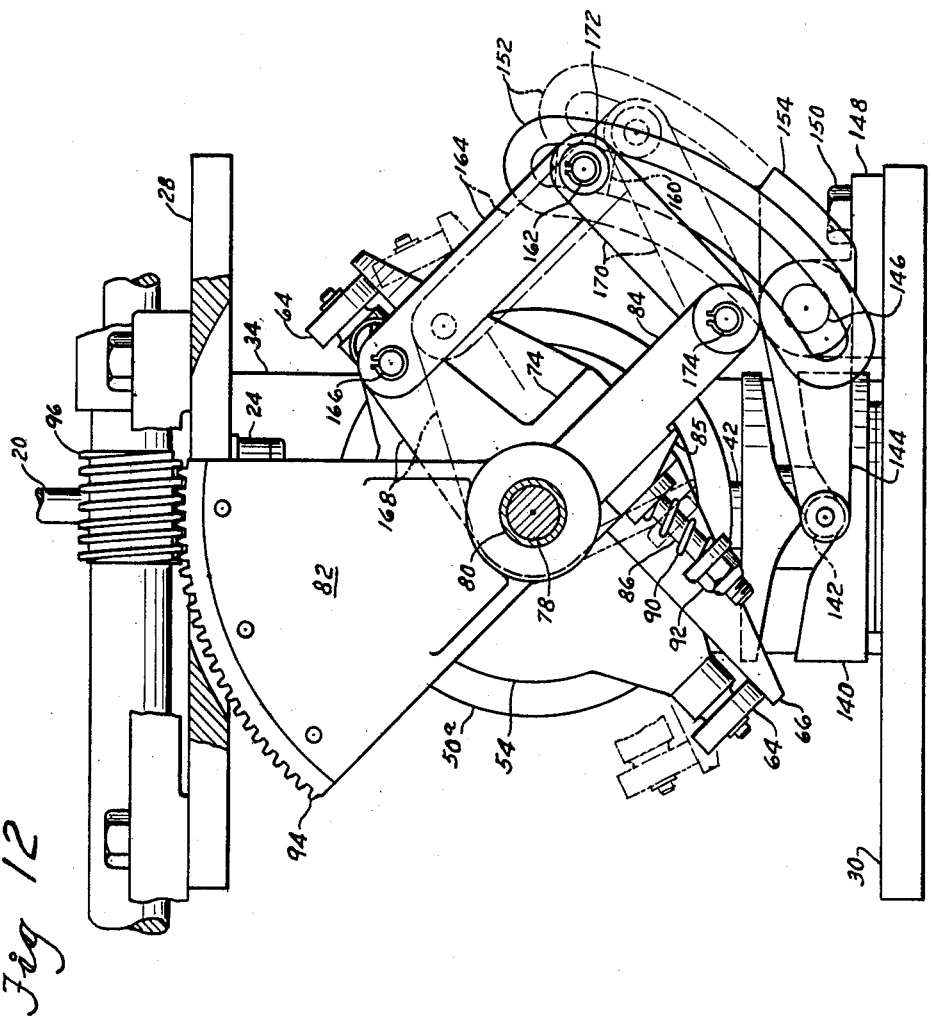

United States Patent Office 3,189,271
Patented June 15, 1965

3,189,271
VARIABLE SPEED DRIVE
Edward D. Rapisarda, West Springfield, Mass., assignor to Gilbert & Barker Manufacturing Company, West Springfield, Mass., a corporation of Massachusetts
Filed Nov. 4, 1959, Ser. No. 850,896
13 Claims. (Cl. 235—61)

The present invention relates to variable speed drives and, while not so limited in its broader aspects, specifically relates to improvements in variators used in liquid dispensing units.

The overall object of the invention is to provide an improved and simplified infinitely variable, variable speed drive having a relatively wide range of speed variation and capable of being accurately adjusted to a desired ratio.

A more specific object of the invention is to reduce the number of parts and simplify variators used in dispensing units for gasoline or the like to rotate visual register wheels at a rate dependent on the unit price of the gasoline so that the register wheels will show the total cost of gasoline delivered.

Another object of the invention is to provide a variator especially suited for the type of dispensing unit wherein two grades of gasoline are blended and the price of gasoline may vary between each delivery dependent on the blend of gasoline desired.

With this in mind a further object is to provide a variator having a single adjustment control for varying the rate at which the visual register wheels are driven.

The present inventive concepts in a variable speed drive may be broadly characterized by a pair of aligned shafts with a one-way drive connection therebetween and including a first gear secured to one shaft and a second gear meshing therewith rotating with the other shaft. Means are provided for rotating the second gear at a uniform rate relative to the other shaft as either shaft is rotated thereby introducing a speed differential between the two shafts. The means for rotating the second gear relative to said other shaft may be optionally employed and are infinitely variable.

In another aspect the invention may be characterized by this same combination with the addition of a third gear meshing with the first gear and also rotating with the said other shaft. The second and third gears are rotated, though not necessarily at a uniform rate, relative to the other shaft by means alternately effective on the second and third gears.

Another concept of the invention is found in using bevel gears in such combinations with the second and third gears rotating on a common axis intersecting the common axis of the aligned shafts.

The inventive concepts embodied in a variator are further characterized by two output shafts, one a gallons shaft and the other a money shaft, both of which are to be driven by a meter in a liquid dispensing unit. A single control element is used to vary the rate of the money shaft relative to the gallons shaft to reflect a desired unit price of the gasoline in tenths of a cent.

The above and other related objects and features of the invention will be apparent from a reading of the following description of the disclosure found in the accompaning drawings and the particular novelty thereof pointed out in the appended claims.

In the drawings:

FIG. 2A is a view taken on line IIA—IIA in FIG. 2;

FIG. 6 is a section taken on either line VI—VI in FIG. 5;

Figure 1:
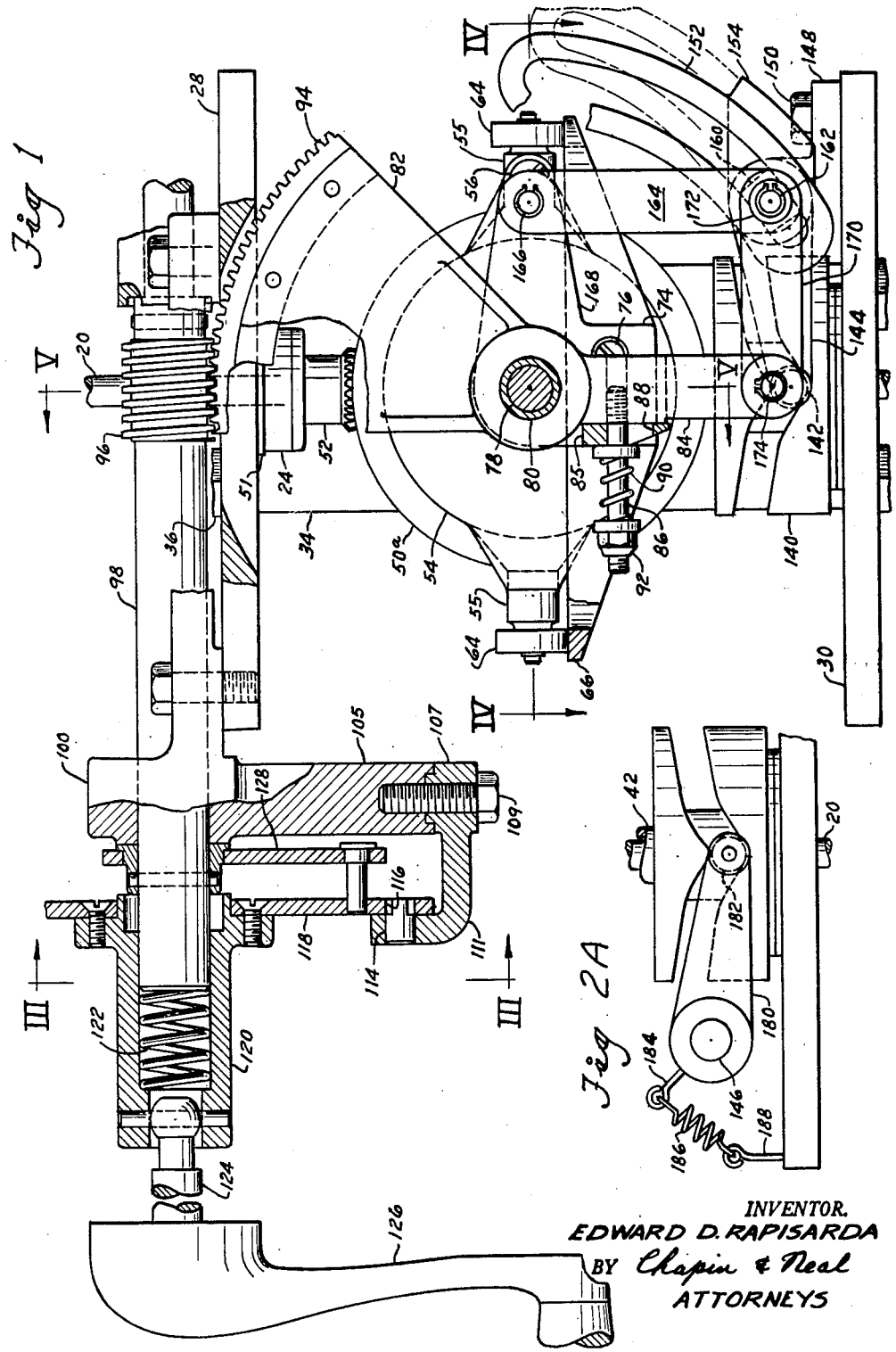
FIG. 1 is a front elevation of a variator embodying the present invention with portions thereof broken away and other portions shown in section.

FIG. 7 diagrammatically shows the present variator incorporated in a gasoline dispensing unit;

FIGS. 8, 9, 10 and 11 are diagrammatic views illustrating the principles of operation of the present mechanism with certain parts rotated 90° between successive views and on the indicated section lines; and FIG. 12 is a view illustrating the operation of a linkage seen in FIG.1.

Figure 2:
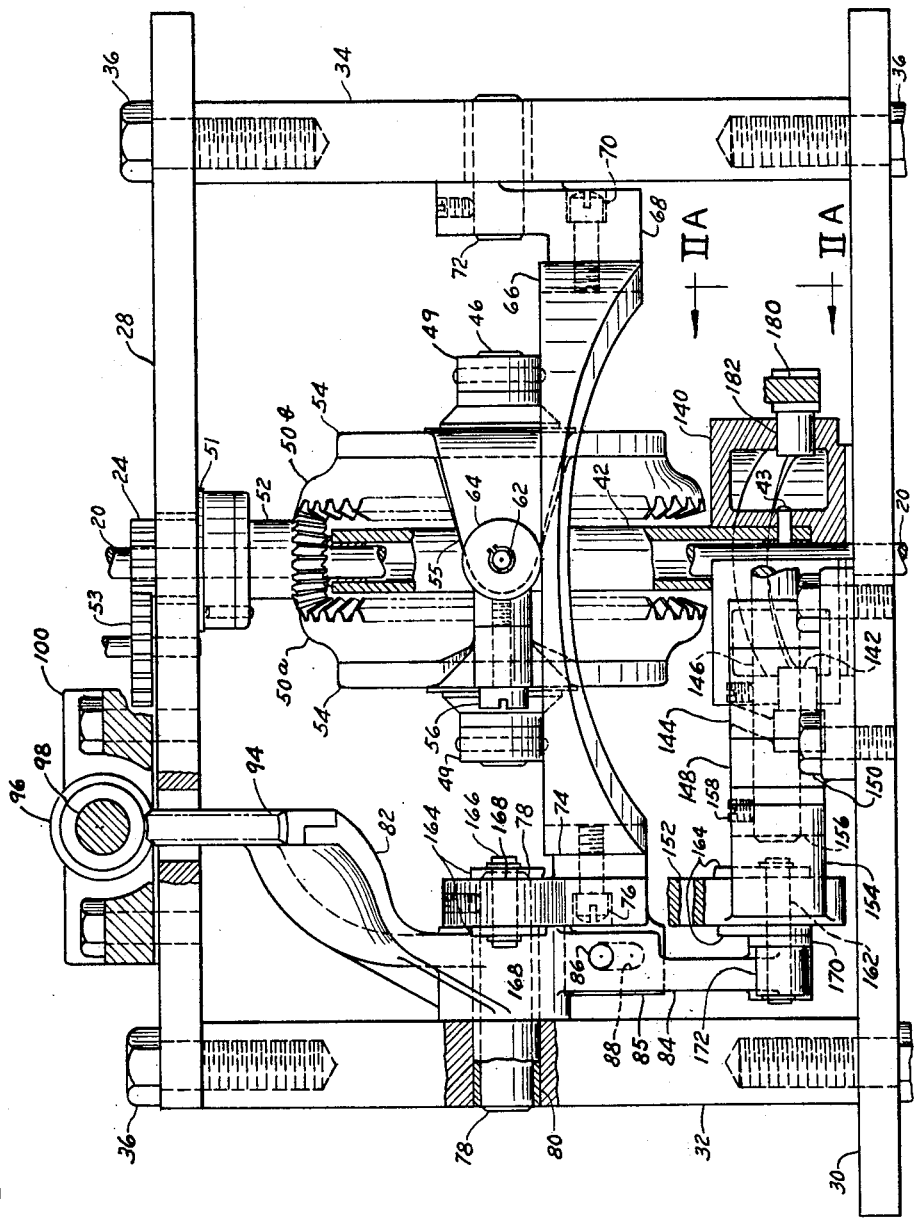
FIG. 2 is a side elevation of the variator.

Referring first to FIG. 2, the lower end of a central shaft 20 is arranged to be operatively connected to and rotated by a meter in a gasoline dispensing unit. The shaft 20 continues upwardly through the illustrated variator and serves as the "gallons" shaft therefor. The shaft 20 rotates at all times at the same rate as the meter and is arranged to drive register wheels indicating the total volume of gasoline delivered to a purchaser. Telescoped over the upper end of the "gallons" shaft 20 is a "money" shaft 24 which is rotated at a rate dependent on the unit cost of the gasoline and drives register wheels indicating the total cost of gasoline passing through the meter. When the unit cost of the gasoline changes, means, provided in accordance with this invention, are shifted to vary the rate of rotation of the "money" shaft 24 so that it will properly drive its register wheels to reflect the new unit cost of the gasoline. This brief description is generic to most all variators, it being one of the objects of the invention to provide an improved variator which can be incorporated in existing designs of liquid, e.g. gasoline, dispensing units.

FIGS. 1 and 2 show an appropriately supported framework comprising a top plate 28, a bottom plate 30 and side plates 32, 34 which are secured together by screws 36. The lower end of shaft 20 is journaled (FIG. 2) in the lower plate 30. A spindle 42 (FIG. 2) is secured to the shaft 20 by a pin 43 and is maintained concentric of the shaft 20 by bushings at its upper and lower ends.

A collar 44 (FIGS. 4 and 5) is telescoped over the spindle 42 and provides inboard support for cross shafts 46 which are pinned thereto and project in opposite directions. A flanged bearing sleeve 48 is held in place on each cross shaft 46 by a collar 49 pinned thereto. A bevel gear 50 is rotatably mounted on each sleeve 48. For purposes which later appear these gears are identified as 50a and 50b. The gears 50a and 50b mesh with a bevel gear 52 (FIGS. 2 and 5) which is pinned to the hollow "money" shaft 24. The "money" shaft 24 is journaled in the top plate 28 and its central bore in turn provides a journal for the shaft 20. A thrust bearing 51 is interposed between the top plate 28 and the flange at the lower end of shaft 24. Gear teeth are formed in the upper end of the shaft 24 and drive a gear 53 as part of the train for rotating the register wheels of the dispensing unit. It is obvious, of course, that gear 52 could be integrally formed on shaft 24.

A spider 54 (FIGS. 1, 2 and 4) is formed by two matching half portions held together by screws 56 passing through arm portions 55 thereof. The spider 54 encompasses the gears 50 and is pivotally mounted relative to the cross shafts 46 by means of a sleeve 58 on the hubs 60 of the gears 50 (see also FIG. 5). Pins 62 (FIG. 4) are force-fitted into the arm portions 55 and lie on a common axis intersecting the intersection of the axes of the spindle 42 and cross shafts 46. Rolls 64 are mounted on the pins 62 and ride on a ring 66. The ring 66 is secured on one side to a trunnion 68 (FIGS. 2 and 5) by screws 70. The trunnion 68 is fast on a short shaft 72 which is pivotally mounted in a journal in the plate 34. A second trunnion 74 is secured by screws 76 to the opposite side of the ring 66. The trunnion 74 is held fast on a shaft 78 journaled within a bearing sleeve 80 which projects from the plate 32.

A tilting lever 82 is pivotally mounted on the bearing sleeve 80 (FIGS. 1 and 2) and for present purposes may be considered as integral with the trunnion 74. In actual construction, however, the lever 82 has a depending arm 84 and the trunnion 74 has an outwardly projecting lug 85 overlapping the arm 84 (see also FIG. 4). A screw 86 is threaded into the arm 84 and passes through a slot 88 in the lug 85. A spring 90 is coiled about the screw 86, held thereon by a nut 92 and yieldingly maintains the trunnion lug 85 against the tilting lever arm 84. Unless forcibly separated the tilting lever 82 and trunnion 74 will rotate as a unit relative to the bearing sleeve 80.

A worm gear segment 94 (FIGS. 1 and 2) is mounted on the upper end of the tilting lever 82 and meshes with a worm 96 secured to a shaft 98. The shaft 98 is journaled on a bracket 100 secured to the top plate 28. The shaft 98 is rotated by appropriate means, later described. Such rotation causes the ring 66 to be tilted about the common axis of the trunnion shafts 72 and 78. At this point it will be noted that the axis of the shafts 72, 78 is normal to the axis of the spindle 42 and intersects the intersection of that axis and the common axis of the cross shafts 46.

Having described the mounting of the ring 66 on which the spider 54 rides, attention will now be directed to the one-way, rotatable drive connection provided between the spindle 42 and the shaft 24. This one-way drive connection is made through both of the gears 50 and takes the form of sprag or overriding clutches (FIGS. 5 and 6) which are identical in all respects as indicated by the two section lines VI—VI in FIG. 5. Each clutch comprises a cam plate 102 secured to the spider 54 by pins 104. Three rises 106 are formed on the periphery of the plate 102 and rollers 108 are urged outwardly along the rises 106 by spring loaded plungers 110. The rollers 108 are thus urged into driving engagement with a steel rim 112 which is secured to each of the gears 50. It will thus be apparent that these overrunning clutches prevent the gears 50a and 50b from rotating in a counterclockwise direction relative to the spider 54 as each are viewed on the section lines VI—VI in FIG. 5.

*Operation of basic variable speed unit*

With the ring 66 lying in a plane normal to the axis of the spindle 42 (as seen in FIGS. 1-6), the aligned output shaft 24 will rotate at the same rate as the shaft 20 and the spindle 42. This relation results from the positive one-way drive connection between the spindle 42 and shaft 24, including the clutch elements just described.

When counterclockwise rotation is imparted to the shaft 20 (FIGS. 1, 2 and 4) and spindle 42, the cross shafts 46 and gears 50 will also rotate in a counterclockwise direction about the common vertical axis of the shaft 20, spindle 42 and shaft 24. The spider 54 cannot rotate relative to the cross shafts 46 (FIGS. 1 and 6) as the wheels 64 ride on the horizontal track provided by the ring 66. This means that the clutch members 102 also cannot rotate relative to the cross shafts 46. The gears 50 (as either is viewed from the outside in FIG. 6), both provide a positive drive connection with the gear 52 which causes the latter gear and the shaft 24 to be rotated in a counterclockwise direction and at the same rate as the shaft 20 and spindle 42.

When it is desired, at the option of the operator, to vary the relative rates of rotation of the shafts 20 and 24, it is simply necessary to tilt the ring 66. As mentioned above this is done by rotating the worm 96 to pivot the tilt lever 82 and with it the ring 66, as indicated by the full line showing in FIG. 12 to which the diagrammatic view of FIG. 8 corresponds. In FIG. 8 three radially aligned points, A, B, and C are indicated on the shaft 46, the clutch member 102 and the gear 50a respectively.

As the spindle 42 is rotated 90° on its axis the shaft 24 will be rotated 90° on its axis due to the positive drive connection therebetween. The shaft 24 will also be rotated an additional amount because of rotation of the gear 50a relative to the cross shaft 46. This is illustrated in FIG. 9 which shows the spindle 42 and the parts carried therewith rotated 90°. It will thus be seen that the spider 54 and gear 50a have rotated 45° relative to the cross shaft 46. There is a 4:1 ratio between the gears 50a and 52. This means that the shaft 24 has been rotated an additional 180° or a total of 270°. Rotating the spindle 42 another 90° again results in a 270° rotation of the shaft 24. This rotation is shown in FIG. 10 where it will be seen that the points B and C have rotated another 45° relative to point A indicating a total of 90° rotation of gear 50a relative to shaft 46 during 180° rotation of spindle 42.

FIG. 10 shows a critical or change-over point in the operation of this drive. Up to this point the spider 54 has rotated in a clockwise direction relative to shaft 46 so that the gear 50a has been positively driven. Now upon further rotation of the spindle 42 the spider 54 will rotate in a counterclockwise direction back to the position shown in FIG. 8. FIG. 11 shows an intermediate position with the parts of spindle 42 rotated a further 90° from its position in FIG. 10. There it will be seen that the point B has rotated 45° back towards point A and the clutch member 102 is no longer in driving engagement with the gear 50a.

As noted FIG. 10 shows a change-over point which is the point where the gear 50b and its clutch members are in the same position relative to ring 66 as the gear 50a in FIG. 8. Thus, further rotation of spindle 42 beyond the FIG. 10 position will result in the gear 50b being driven in a clockwise direction relative to its shaft 46 by its associated clutch members, when viewed from the outside. This change-over is instantaneous so that the gear 52 is continuously driven by first the gear 50a and then the gear 50b. The gears 50a and 50b always rotate in the same direction relative to shaft 46, which is clockwise when either gear is viewed from the outside. Thus it will be seen from the position of point C in FIG. 11, that the gear 50a has continued to rotate even though not driven by its clutch members.

From the position of FIG. 11 the parts rotate back to the position of FIG. 8, which is another changeover point whereat the gear 50a is positively driven and the gear 50b begins to "free wheel."

In summary the spindle 42 is rotated on its axis resulting in the aligned shaft 24 being rotated on its axis in the same direction but at a faster rate. Rotative movement is transmitted to the gear 52 and shaft 24 by the gears 50a and 50b which are alternately driven by their associated clutch members. Rotation of the gears 50a and 50b about the shafts 46 causes a speed differential between the spindle 42 and shaft 24, dependent on the angle of tilt of the ring 66. In the illustrated 45° position of ring 66, the shaft 24 rotates 3 times for each revolution of spindle 42.

It will be appreciated that the present variable drive is reversible in that the shaft 24 could be the input shaft and the spindle 42 the output shaft. If this were done the shaft 24 would have to be rotated in a clockwise direction because of the effective direction of the one way clutches.

*Indexing mechanism*

While it is possible to obtain an infinite variation in the speed of the output or "money" shaft 24, it is necessary to incrementally vary the rate of rotation of the "money" shaft of a variator in steps corresponding to the lowest significant figure by which the cost of the gasoline is computed. Thus for gasoline priced at 25.7¢/gal. the "money" shaft rotates at a given rate and for gasoline priced at 25.8¢/gal. the "money" shaft must rotate at a faster rate corresponding to the increased increment of speed needed for the register wheels driven thereby to reflect the increased unit price of the gasoline. In this case tenths of cents are the lowest significant figure.

Figure 3:
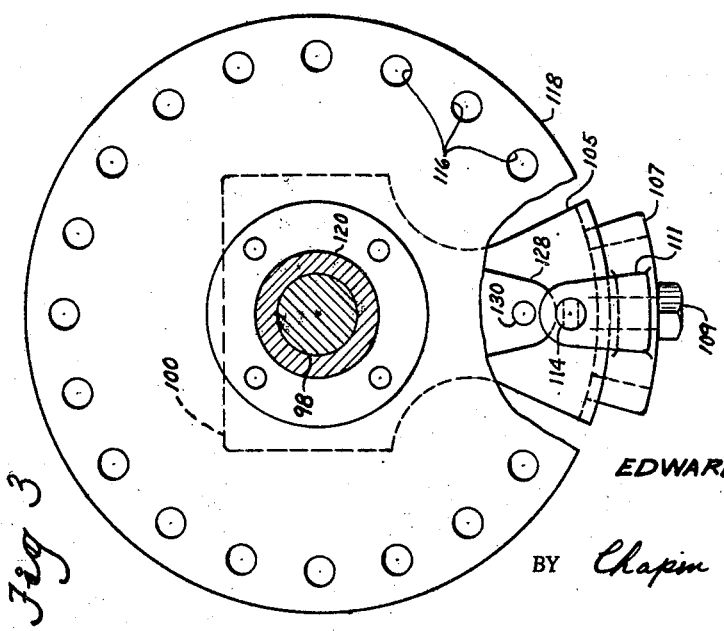
FIG. 3 is a section taken on line III—III in FIG. 1.

The means now to be described are provided to obtain incremental adjustment of the "money" shaft 24. Referring to FIGS. 1 and 3, it will be seen that the bracket 100 is provided with a depending plate 105, the lower end of which is formed concentrically of the shaft 98. A lug 107 is secured to the lower end of the plate 105 by a screw 109 passing through a slot in the lug 107. This arrangement permits the lug to be shifted on the plate 105 to obtain a desired angular relation relative to the shaft 98. The lug 107 has an L-shaped arm 111 from which a flatted pin 114 projects. The pin enters one of a series of angularly spaced holes 116 formed in an index plate 118. The index plate is secured to a coupling member 120 which slidingly receives one end of the shaft 98. A spring 122 bears against the end of shaft 98 and urges the coupling member outwardly as limited by engagement of the plate 118 with the arm 111. A shaft 124 projects from the coupling 120 with an operating handle 126 secured to its outer end. An arm 128 is disposed between the index plate 118 and the bracket plate 105. The arm 128 projects from a hub secured to the shaft 98 and has a pin 130 at its lower end projecting into a hole in the index plate 118 spaced radially inwardly of the holes 116.

It is preferred that the circular track provided by ring 66 be adjustable to a plane which is absolutely normal to the common vertical axis of the spindle 42 and shaft 24. This end is attained by adjusting the lug 107 relative to the plate 105, so that the pin 114 enters one of the holes 116 when the shaft 98 is rotated to bring the circular track to this absolutely normal relation. It will be noted that the top and bottom surfaces of the pin 114 are flattened so as to minimize the need for accurately locating the pin 114 relative to the holes 116 in a radial sense.

The angular spacing between the holes 116 (FIG. 3) and the various gear ratios are predetermined so that rotation of the shaft 98 the angular distance between adjacent holes 116 will result in the "money" shaft 24 rotating at an increased or decreased rate relative to the "gallons" shaft representative of an increase or decrease of one-tenth of a cent in the cost of the gasoline.

Adjustment of the angle of tilt of ring 66 is a simple matter. An operator merely needs to shift the handle 126 inwardly to free the index plate 118 from the pin 114. The handle 126 may then be rotated to bring the ring 66 to the desired angle of tilt. In this connection it will be noted that the shaft 98 is rotated by the arm 128 which is coupled to the index plate 118.

When the handle 126 is released it will not return to its outer position unless indexed so the pin 114 enters one of the holes 116. When the index plate is so positioned, the shaft 24 will rotate at a rate reflecting the unit cost of gasoline in an even tenth of a cent. If desired, an interlock may be provided to prevent delivery of gasoline unless the index plate is positioned by the pin 114 so that the "money" shaft will reflect an even tenth of a cent.

Referring now to FIG. 7, one advantageous embodiment of the present variator in a gasoline dispensing unit is seen. The handle 126 is readily available on the exterior of the housing 134. Rotation of the handle causes the ring 66 to be tilted, as explained. Further, a mechanical connection 135 is provided between the shaft 98 and the register wheels 136 which indicate to the customer the unit price of the gasoline. The operator may, by means of the single handle 126 change the relative rate of rotation of the "money" shaft and simultaneously the register wheels 136 will be adjusted to show this new rate in terms of the unit cost of the gasoline. The range of adjustment, using the single handle 126, is sufficient to cover the normal span of prices for all grades of gasoline throughout the country.

The variator, as indicated in FIG. 7, is in the same relative location in the dispensing unit as a conventional variator and from the money and gallons shafts the drive for the register wheels 137, 138 is conventional to indicate the quantity and price of each delivery of gasoline. Also it is diagrammatically indicated that the variator is driven from a meter 139 in the same fashion as conventional variators.

Compensating means for giving substantially uniform rotation of the output shaft As thus far described, the output shaft 24 would rotate at a non-uniform rate when the ring 66 is tilted. This results from the manner in which the gears 50a and 50b are rotated relative to the shafts 46. While the gear 50a (FIG. 8) is rotated 45° when the spindle 42 is rotated 90° (FIG. 9) the rate of rotation is instantaneously zero in the position of FIG. 8 and reaches a maximum in the position of FIG. 9. This relationship is in the nature of a sine curve resulting from the use of a tilted circular plate to oscillate the spider 54.

The means now to be described compensate for this action to give substantially uniform rotation of the output shaft 24.

Figure 4:
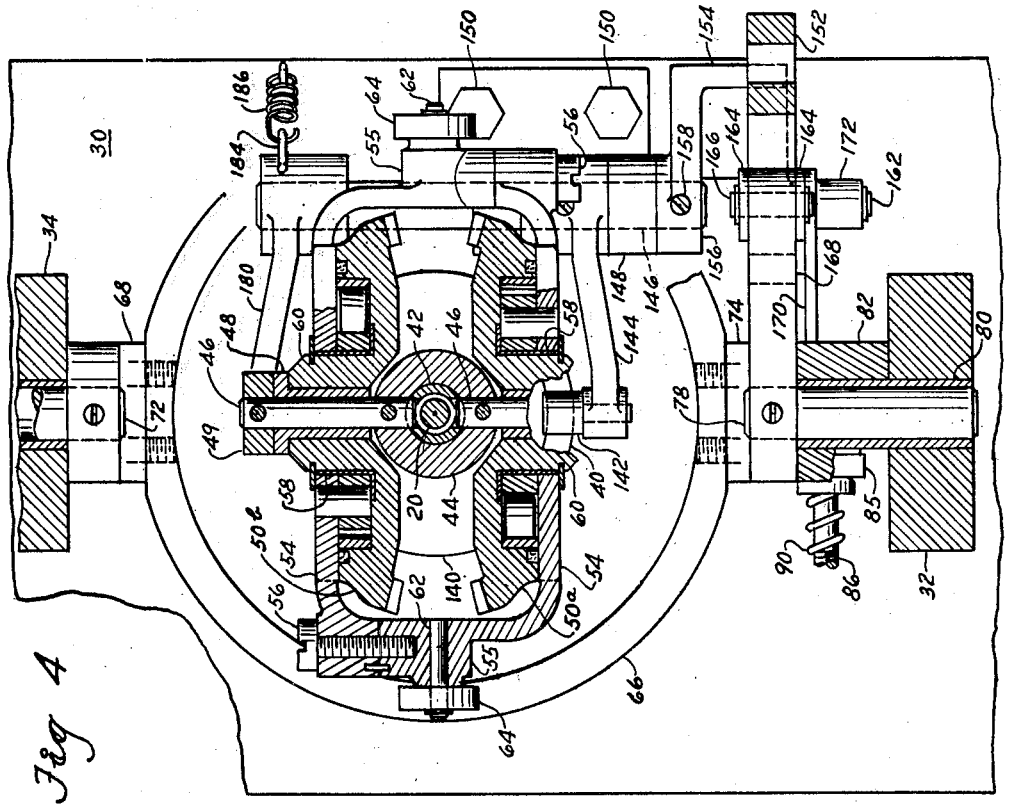
FIG. 4 is a section taken on line IV—IV in FIG. 1.
Figure 5:
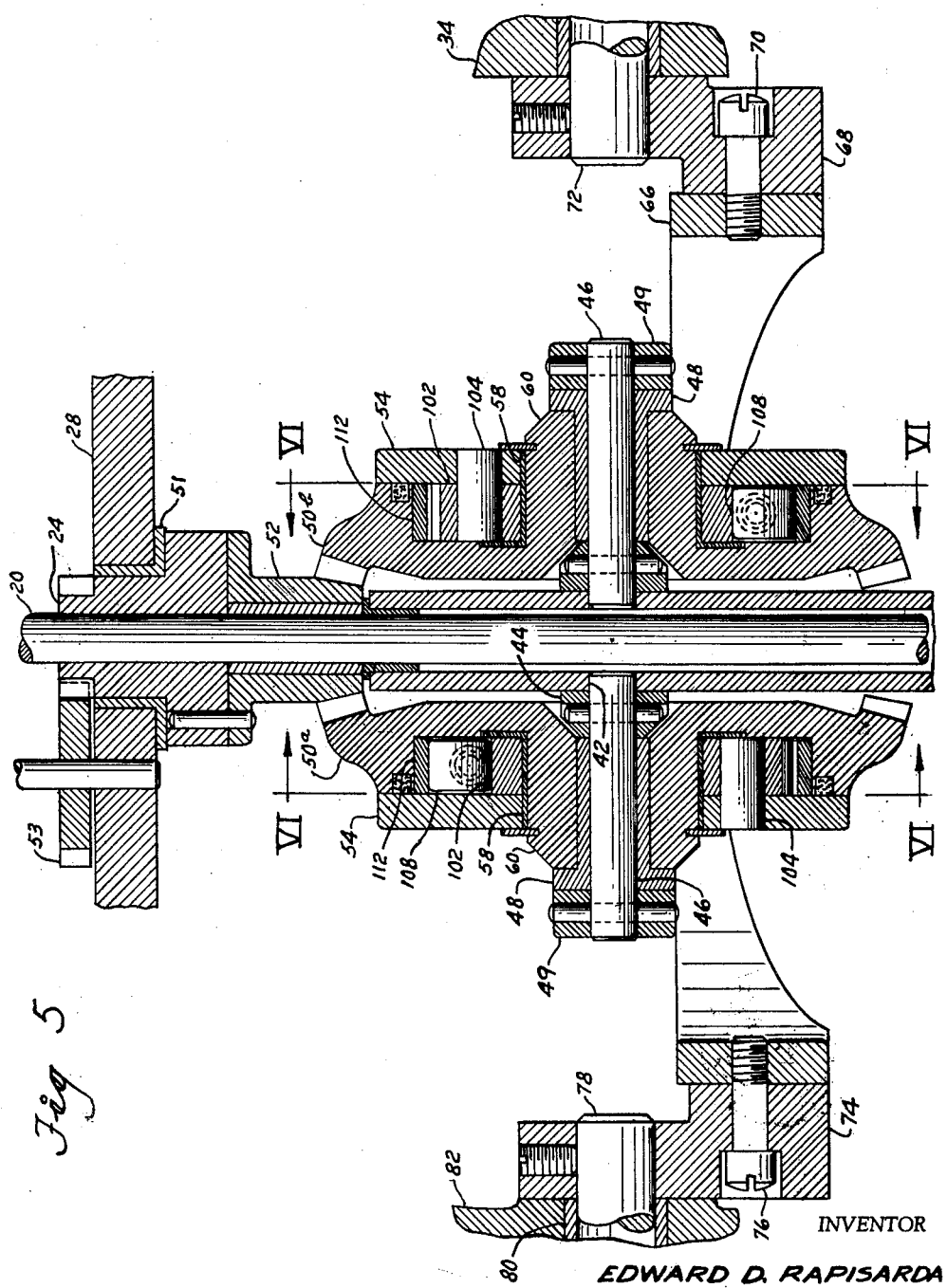
FIG. 5 is a section, on an enlarged scale, taken on line V—V in FIG. 1.

A barrel cam 140 (FIGS. 1–4) is secured to the shaft 20 by the pin 43 (FIG. 2). A roll 142 (FIG. 4) rides within the cam groove and is mounted on a lever 144 which is secured to a shaft 146. The shaft 146 is journaled on a bracket 148 which is secured to the bottom plate 30 by screws 150. A slotted lever 152 is rigidly connected to the shaft 146, more specifically the lever 152 is provided with an integral offset strap 154 linking it to a hub 156 which is held fast on the shaft 146 by a set screw 158 (FIG. 4).

The slot in lever 152, as seen in FIG. 1, is generated by a radius swung from the axis of pin 78 about which the ring 66 is pivoted. Also the center line of this curved slot intersects the axis of shaft 146, as can best be seen in FIG. 12. A curved slide block 160 (FIG. 1) rides within this slot and receives a pin 162 the axis of which intersects the centerline of the slot. A pair of links 164 (FIGS. 1 and 2) pivotally receive the pin 162 on opposite sides of the lever 152. The upper ends of the links 164 are pivotally connected by a pin 166 to an arm 168 projecting from the trunnion 74 (FIG. 2). Also a link 170 having a bearing collar 172 pivotally receives the pin 162. The link 170 is pivotally connected by a pin 174 to the lower end of the tilt lever arm 84.

It will now be appreciated that the tilt lever 82 and ring 66 are connected to the slotted lever 152 by a parallel linkage comprising lever arm 84, trunnion arm 168 and links 164 and 170.

When the ring 66 is horizontal, as in FIG. 1, this parallel linkage has no effect on the operation of the variator. Thus the cam 140 will rotate with the spindle 42 and the slotted arm 152 will oscillate as shown by the phantom outline thereof. However, the axis of pin 162 is coincident with the axis about which the lever 152 is oscillated, hence there is no movement imparted to the parallel linkage.

However, once the ring is tilted, the parallel linkage becomes effective to compensate for the normal non-uniform oscillation of the spider 54 as it rides around the ring 66. This action may best be seen by reference to FIG. 12. The full line showing illustrates the lever 82 swung 45° to give a 45° tilt to the ring 66 and the roller 142 riding on the low point of the cam 140. Rotation of the cam through 90° will bring the roller 142 to the high point of the cam 140 and the positions of the various parts at this time are illustrated by the phantom showing. It will be seen that the ring 66 is tilted to an angle less than 45° as the lever 152 is swung to its outermost position.

In this fashion a second means is provided for rotating the gears 50a and 50b relative to their shafts 46. Thus for example, starting from the full line showing of FIG.

12, 9° rotation of the spindle 42 should be matched by 4.5° rotation of the gear 50a on shaft 46 in order to get uniform rotation of the gear 50a. Rotation of the spider 9° by the spindle 42 will cause the spider to be rotated less than 1° about the shaft 46. Thus the ring 66 must be tilted more than 3.5° in the first 9° increment of rotation of the spindle 42 so that the total rotation imparted to the gear 50a will be 4.5°. In the next 9° increment of spindle rotation, movement of the spider 54 on the ring 66 will cause a greater rotation of gear 50a relative to shaft 46 and the ring 66 needs to be tilted a lesser amount to obtain 4.5° rotation of the gear 50a. The ring is therefore progressively tilted away from its 45° position as the spindle 42 rotates. When the spindle 42 has been rotated 90° (corresponding to the showing in FIG. 9) the roll 142 is on the high point of cam 140 and the parts are in the phantom position of FIG. 12. It will be noted that the lever 82 remains stationary and the spring 90 is compressed as the separable ring 66 is tilted to its phantom position by the lever 152 working through the described parallel linkage.

At this time the instantaneous rotation imparted to gear 50a on shaft 46 by the spider 54 is in the ratio of 4.5° for a 9° rotation of spindle 42. At this instantaneous time there is no tilting action imparted to ring 66. Thereafter the action of the spider 54 alone is not sufficient to impart sufficient rotary movement to the gear 50a. This is again compensated for by imparting additional tilting movement to bring the ring back to its maximum angle of tilt when the spindle 42 is rotated 180° (corresponding to FIG. 10). During the next 180° rotation of spindle 42 gear 50b is rotated in this same fashion.

It will be noted that the initial rises from the low points on cam 140 are quite steep. In theory these rises should be even steeper to give absolute uniform rotation of the gears 50a and 50b. However, for all practical purposes the rotation of these gears and the output shaft 24 are considered uniform. In the practical sense, and fraction of a gallon may be discharged from a gasoline dispensing unit (FIG. 7) and the register wheels 136 will indicate the total cost of the amount delivered with an accuracy matching that of the meter or the mechanism to which the money shaft is attached, for driving the money register wheels.

It will be apparent that when the lever 82 is swung to tilt the ring 66 to a lesser extent, then a lesser, but proportionate, compensating action will be provided by the slotted arm 152 acting through the described parallel linkage and actuated by the cam 140.

One further point to be noted is that the steepness of the rises and depressions of cam 140 present certain unobvious problems. When the roll 142 is cammed upwardly it must overcome the force of spring 90 and also rotate all the mechanism driven by the shaft 42. This results in a relatively high torque force on the input shaft 20 which tends to overload or strain the meter from which it is driven. Conversely when the roll 142 is descending a depression on the cam 140 it exerts a torque force, derived from spring 90, tending to rotate the shaft 20 faster than the meter so that the spindle 42 will run away from the meter and the register indicating wheels will not reflect the true amount of gasoline delivered.

These problems are overcome by providing a torque force which balances the torque force created by the pressure of the roll 142. Thus in FIG. 2A it will be seen that a lever 180 is pivotally mounted on the shaft 146 and has a roll 182 at its outer end which bears against the upper surface or track of the barrel cam 140. A pin 184 projects from the hub of lever 180 and is connected by a spring 186 to a hook 188 on the bottom plate 30. The spring 186 urges the roll 182 against the upper track of the barrel cam and creates a torque force on the spindle 42 opposed to that of the roll 142. Thus when roll 142 tends to accelerate the spindle 42, roll 182 tends to retard it with an equal torque force.

In passing, one further problem will be noted. When the gasoline stops flowing through the meter there is a tendency for the rotating elements of the variator to continue rotating because of their inertia. This problem can be overcome, as in conventional variators, by providing a one-way drive between the shaft 20 and the meter.

There will, of course, be many variations to the disclosed embodiment apparent to those skilled in the art. The scope of the invention is therefore to be derived from the following claims.

Having thus described the invention, what is claimed as novel and desired to be secured by Letter Patent of the United States is:

1. A variable speed drive comprising a pair of aligned shafts rotatable on a common axis, means for providing a positive drive connection between said shafts in one direction of rotation of either of said shafts, said means including a gear secured to one of said shafts and a pair of gears meshing with said one gear on opposite sides thereof, journal means connected to said other shaft for rotation therewith in a fixed ratio, said pair of gears being mounted on said journal means and rotatable relative thereto, and optional means for alternately driving said pair of gears to rotate said gears relative to said journal means as either shaft is rotated, thereby introducing a speed differential between said shafts, said optional means being adjustable.

2. A variable speed drive comprising a pair of aligned shafts rotatable on a common axis, means for providing a positive drive connection between said shafts in one direction of rotation of either of said shafts, said means including a gear secured to one of said shafts, a pair of gears meshing with said one gear on opposite sides thereof, journal means connected to said other shaft for rotation therewith, said pair of gears being mounted on said journal means for rotation relative thereto, a ring encompassing said gears and providing a circular track lying in a plane normal to said common axis, a member constrained to ride upon said circular track as said shafts rotate, said member when said circular track is in said normal plane being fixed relative to said pair of gears, means for tilting said ring to cant the track away from said normal plane whereby the said member will oscillate relative to the axes of said gears, and means for alternately transmitting said oscillatory motion to first one and then the other of said gears during each 180° rotation of said other shaft, thereby introducing a speed differential between said aligned shafts.

3. A variable speed drive as in claim 2 wherein means are provided for oscillating the ring to and from its canted position at a rate imparting substantially uniform rotation to said pair of gears in combination with the oscillatory movement of said member whereby when either shaft is rotated at a uniform rate the other shaft rotates at a substantially uniform rate.

4. A variable speed drive comprising a pair of aligned shafts rotatable on a first common axis, means for providing a positive drive connection between said shafts in one direction of rotation of either of said shafts, said means including a bevel gear secured to one of said shafts and a pair of bevel gears meshing with said one bevel gear on opposite sides thereof and rotatable on a second common axis normal to and intersecting said first common axis and journal means connected to said other shaft for rotation about said first common axis, said pair of gears being rotatable on said journal means about said second axis, a ring encompassing said gears, a member rotatable with said other shaft and mounted for oscillation relative to said second common axis, force transmitting means effective in one direction only between said gear and said oscillator member, said member having arms riding on said ring controlling its oscillatory movement whereby when the ring is in a plane normal to said first common axis there will be no oscillatory movement of said member and the two shafts will rotate at the same rate when either shaft is rotated, and selectable means for tilting said ring about an axis normal to and intersecting said first common axis whereby said member will oscillate when either shaft is rotated and the resultant rotation of said pair of bevel gears will introduce a speed differential between said shafts dependent upon the extent to which the ring is tilted.

5. A variable speed drive comprising a pair of aligned shafts rotatable on a first common axis, means for providing a positive drive connection between said shafts in one direction of rotation of either of said shafts, said means including a bevel gear secured to one of said shafts and a pair of bevel gears meshing with said one bevel gear on opposite sides thereof, said other shaft having a pair of oppositely directed cross shafts on which the pair of bevel gears are mounted for rotation about a second common axis normal to and intersecting said first common axis, a ring encompassing said gears, said ring being pivotably mounted about an axis normal to the first common axis and intersecting the point of intersection of said two common axes, a spider encompassing said pair of bevel gears and mounted for oscillatory movement about said cross shafts, overruning clutch means comprising a cam plate secured to said spider adjacent each of said pair of gears and rollers engageable with said pair of gears for transmittiing force in one direction only between said spider and said pair of gears, said spider having arms projecting outwardly and riding on said ring with the points of contact between said arms and ring lying on a line normal to said second common axis and intersecting said first common axis, said arms controlling oscillatory movement of said spider whereby when the ring is in a plane normal to said first common axis there will be no oscillatory movement of said spider and the two shafts will rotate at the same rate when either shaft is rotated and selectable means for tilting said ring away from said normal plane whereby said spider will oscillate when either shaft is rotated and the resultant rotation of said pair of bevel gears will introduce a speed differential between said shafts.

6. A variable speed drive as in claim 5 wherein means are provided for oscillating said ring in predetermined timed relationship to the rotation of said other shaft and at a rate imparting substantially constant rotation to said pair of bevel gears relative to said cross shafts whereby both shafts will rotate at a substantially uniform rate when one of the shafts is rotated.

7. A variable speed drive as in claim 6 wherein the means for tilting said ring comprise a tilt lever rotatable about the axis of tilt for said ring and means for rotating said lever about said axis, a resilient connection between said ring and said lever normally holding said ring in a fixed position relative to said lever and wherein the oscillating means comprise a parallel linkage having a relatively fixed pivot point integral with said lever, a link connected to said pivot point, a second link pivotally connected to said ring and a pin joining the opposite ends of said links, a slotted lever having a slot generated by a radius from the tilt axis of said ring, said pin being guided for movement along said slot, said slotted lever being mounted for oscillatory movement about an axis parallel to said tilt axis, said pin being aligned with said slotted lever axis when said ring is in a plane normal to said first axis, a cam secured to said other shaft, a cam lever connected to said slotted lever and guided by said cam in such timed relation that the slotted lever will oscillate as said other shaft is rotated and oscillatory movement will be imparted thereby to said ring to impart substantially constant rotation to said bevel gears, when said tilt lever is rotated to tilt said ring.

8. A variable speed drive as in claim 7 wherein the cam is a barrel cam and a second cam lever is provided opposite said first cam lever and spring force is applied to said cam through said second lever in a direction opposite to the force applied by said first lever and approximately equal thereto to thereby minimize, if not eliminate, any resultant torque force on said other shaft.

9. In a liquid dispensing unit having a meter and register wheels for indicating the amount and cost of liquid delivered and also its unit cost, a variator comprising a vertically disposed shaft adapted to be connected at its lower end to the meter, the upper end of said shaft serving as a "gallons" shaft for driving the amount or gallon register wheels in the dispensing unit, a tubular "money" shaft telescoped over the upper end of said "gallons" shaft and adapted to drive the cost or money register wheels in the dispensing unit, both of said shafts being rotatable on a vertical common axis, a bevel gear secured to the lower end of said "money" shaft and also telescoped over said "gallons" shaft, said "gallons" shaft having a pair of oppositely directed cross shafts connected thereto for rotation therewith, a pair of bevel gears meshing with said one bevel gear on opposite sides thereof and mounted on said cross shafts for rotation on a horizontal common axis intersecting said vertical common axis, a ring encompassing said gears, said ring being pivotally mounted about an axis normal to said vertical axis and intersecting the point of intersection of said two axes, a spider encompassing said pair of bevel gears and pivotally mounted on the hubs of said pair of bevel gears for oscillatory movement relative to said cross shafts, overrunning clutch means connecting said spider and said pair of bevel gears and comprising a cam plate secured to said spider adjacent each of said pair of gears and rollers engageable with said pair of gears for transmitting force in one direction only between said spider and said pair of gears, said spider having arms projecting outwardly with rolls on the ends thereof riding on said ring with the points of contact between said rolls and ring lying on a line normal to said horizontal common axis and intersecting said vertical common axis, said arms controlling oscillatory movement of said spider whereby when the ring is in a horizontal plane there will be no oscillatory movement of said spider and the "gallons" shaft and "money" shaft will rotate at the same rate when the "gallons" shaft is rotated by the meter, a tilt lever mounted for rotative movement about the pivot or tilt axis of said ring, a gear drive for so rotating said tilt lever and tilting said ring whereby oscillatory movement of said spider will cause said pair of gears to rotate on said cross shafts and introduce a speed differential between said shafts when the "gallons" shaft is rotated, a resilient connection between said ring and said lever normally holding said ring in a fixed position relative to said lever, index means for limiting rotative movement of said tilt lever to angular increments representative of the lowest significant figure of the unit cost of the liquid, and means for oscillating said ring in predetermined timed relationship to the rotation of said first shaft and at a rate imparting substantially constant rotation to said pair of bevel gears relative to said cross shafts whereby the "money" shaft will rotate at a substantially uniform rate when the "gallons" shaft is rotated, said oscillating means comprising a parallel linkage having a relatively fixed pivot point on said tilt lever, a link connected to said fixed pivot point, a second link pivotally connected to said ring and a pin joining the opposite ends of said links, a slotted lever having a slot generated by a radius from the tilt axis of said ring, said pin being guided for movement along said slot, said slotted lever being mounted for oscillatory movement about an axis parallel to said tilt axis, said pin being aligned with said slotted lever axis when said ring is in a horizontal plane, a cam secured to said meter driven shaft, a cam lever connected to said slotted lever and guided by said cam so that the slotted lever will oscillate as said "gallons" shaft is rotated and oscillatory movement will be imparted to said ring as the resilient ring and the tilt lever yields when said tilt lever is rotated to tilt said ring, said cam being formed so that the resultant oscillatory movement of the ring imparts substantially uniform rotation to the pair of bevel gears and the "money" shaft.

10. A variator as in claim 9 wherein the gear drive for rotating the tilt lever comprises a worm having a shaft extending therefrom and wherein means are provided for rotating the unit cost register wheels in response to rotation of said worm shaft, and further wherein the index means for limiting rotative movement of the tilt lever comprises an arm projecting from the worm shaft and having a pin extending therefrom, an index plate slidably mounted on the end of said worm shaft and having a hole slidably receiving the pin on said arm for movement of said plate axially of said worm shaft, said index plate having a series of equiangularly spaced holes, a bracket limiting movement of said index plate outwardly of said worm shaft and having an index pin for selectively entering said series of holes, spring means urging said index plate outwardly of said worm shaft and telescoping one of said series of holes over said index pin, said index pin being angularly adjustable relative to said worm shaft to enable the ring to be accurately positioned in a horizontal plane, an externally disposed crank shaft connected to said index plate, a crank arm mounted on said crank shaft adapted to shift the plate axially inwardly of said worm shaft and thereby bring said index plate clear of said index pin so that the worm shaft may be rotated to obtain a desired angle of tilt for said ring and simultaneously rotate the cost wheels to indicate the unit cost of liquid as established by the angle of tilt of the ring.

11. A variator comprising a "gallons" shaft and a "money" shaft rotatable on a first common axis and adapted to be driven by a meter in a liquid dispensing unit, means for providing a positive drive connection between said shafts in one direction of rotation of said "gallons" shaft, said means including a bevel gear secured to said "money" shaft and a pair of bevel gears meshing therewith on opposite sides thereof, said pair of gears being rotatable with said "gallons" shaft about said first axis and also rotatable on a second common axis normal to and intersecting said first common axis, and optional means for imparting rotary movement to said pair of gears about said second axis when said "gallons" shaft is rotated on said first axis to thereby introduce a speed differential between the "money" shaft and the "gallons" shaft, and means for varying said optional means by incremental steps of rotary movement of said pair of gears sufficient to cause the rotation of said "money" shaft to be varied in increments reflecting the lowest significant figure for the unit cost of the liquid.

12. In a liquid dispensing unit having a variator comprising a shaft adapted to be driven by a meter in the dispensing unit, a "money" shaft aligned therewith, said shafts being rotatable on a common axis, means for providing a positive drive connection between said meter driven shaft and said "money" shaft in one direction of rotation of said meter driven shaft, said means including a gear secured to said "money" shaft and another gear meshing therewith, said other gear being rotatable with said meter driven shaft and also rotatable relative thereto, and optional means for rotating said other gear relative to said meter driven shaft at a substantially uniform rate when said meter driven shaft is rotated thereby introducing a speed differential between said shafts and means for varying said optional means in increments sufficient to cause the "money" shaft to be varied by incremental steps in its rate of rotation reflecting the lowest significant figure by which the unit cost of the gasoline is measured, the range of adjustment of said varying means being sufficient to cover a plurality of digits or figures and a single control lever for operating said varying means.

13. A variator as in claim 12 wherein the single control lever is mounted exteriorly of said dispensing unit and wherein the dispensing unit has register wheels for indicating the unit cost of the liquid and a mechanical connection is provided between said varying means and said unit cost register wheels for causing said register wheels to reflect the unit cost of the liquid as determined by the rate of rotation of said money shaft.

References Cited by the Examiner

UNITED STATES PATENTS

| | | | |
|---|---|---|---|
| 908,697 | 1/09 | Pupke | 74—679 |
| 1,285,399 | 11/18 | Runge. | |
| 1,461,316 | 7/23 | La Casse | 74—816 |
| 2,023,579 | 12/35 | Dodge | 74—679 X |
| 2,111,996 | 3/38 | Slye | 74—6 |
| 2,128,413 | 8/38 | Hejuk | 235—61 |
| 2,159,739 | 5/39 | Johnson | 74—679 |
| 2,244,657 | 6/41 | Bell | 74—112 |
| 2,364,915 | 12/44 | Pressler | 74—679 |
| 2,619,849 | 12/52 | Trexler | 74—6 |
| 2,682,368 | 6/54 | Boutillon | 235—61 |
| 2,716,520 | 8/55 | Kellogg et al. | 235—61 |
| 2,836,361 | 5/58 | Haupt | 235—61 X |
| 2,883,882 | 4/59 | Neukirch | 74—679 |
| 2,898,780 | 8/59 | Carlsen et al. | 74—816 |
| 2,996,221 | 8/61 | Grise | 222—26 |
| 3,077,289 | 2/63 | Rapisarda | 222—26 |
| 3,082,646 | 3/63 | Friedmann | 74—112 |

LEO SMILOW, *Primary Examiner.*